United States Patent
Takahashi et al.

(10) Patent No.: US 7,248,013 B2
(45) Date of Patent: Jul. 24, 2007

(54) MOTOR DRIVE CIRCUIT

(75) Inventors: Hidenori Takahashi, Saitama (JP); Koichi Nagata, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 11/430,888

(22) Filed: May 10, 2006

(65) Prior Publication Data

US 2006/0257125 A1   Nov. 16, 2006

(30) Foreign Application Priority Data

May 11, 2005  (JP)  ............ P.2005-138038

(51) Int. Cl.
G05B 11/28   (2006.01)
(52) U.S. Cl. .............. 318/599; 318/811; 318/432
(58) Field of Classification Search ........... 318/599, 318/811, 139, 432, 434
See application file for complete search history.

(56) References Cited

U.S. PATENT DOCUMENTS 5,689,164 A * 11/1997 Hoft et al. ............ 318/701
5,789,723 A *  8/1998 Hirst .................... 219/501
6,847,016 B2 * 1/2005 Hirst .................... 219/486
6,847,186 B1 * 1/2005 Kerlin .................. 318/751

FOREIGN PATENT DOCUMENTS

| EP | 1 087 249 A2 | 3/2001 |
| JP | 6-243962 A | 9/1994 |
| JP | 7-245958 A | 9/1995 |
| JP | 8-51781 A | 2/1996 |

* cited by examiner

Primary Examiner—Rina Duda
(74) Attorney, Agent, or Firm—Birch, Stewart, Kolasch & Birch, LLP

(57) ABSTRACT

A motor drive circuit is provided and includes: a PWM wave generation circuit for generating a PWM (pulse-width-modulated) wave having a high frequency, whose pulse width has been modulated, in response to a rotational frequency control signal used for driving a motor; a switching element (FET) that receives an input of a PWM wave output from the PWM wave generation circuit and performs switching operation; and a current resonance circuit including an inductance and a capacitor. Current resonance is induced in response to power of a battery cell imparted by means of operation of the switching element. A value falling within the range of 60 to 90 KHz, which is 1.1 to 1.7 times as large as a switching frequency 54 KHz of the switching element, may be selected and set for the resonance frequency.

20 Claims, 3 Drawing Sheets

--- VOLTAGE V
— CURRENT I

--- VOLTAGE V
— CURRENT I

MOTOR DRIVE CIRCUIT

FIELD OF THE INVENTION

The present invention relates to a motor drive circuit, and more particularly, to the configuration of a drive circuit which is applied to a drive motor for effecting a vibration-proof function, or the like, of a binocular or a camera and which enables lowering of power consumption.

BACKGROUND OF THE INVENTION

For instance, a binocular (a stabiscope or the like) or a camera has a vibration-proof function. A prism of the binocular is driven and controlled by a direct motor; and an imaging element, or the like, of the camera is driven and controlled. Even in a situation where vibrations or hand movements arise, a stable state where vibrations are absorbed can be achieved. A pulse-width-modulation (PWM)-controlled circuit has hitherto been used as a drive circuit for such a motor.

FIG. 5 shows a configuration of a PWM-controlled motor drive circuit. As shown in FIG. 5, in the drive circuit, a Schottky diode 2 is connected in parallel to a driving motor 1 interposed between a source terminal Va and a ground, and a switching element 3, assuming the form of a field-effect transistor (FET) or the like, is connected in series with the driving motor 1. A PWM wave control circuit 4 is provided at a gate of the switching element 3. The PWM wave control circuit 4 generates a PWM wave having a frequency of, e.g., 54 KHz, in response to an input rotational frequency control signal, and sends the PWM wave to the switching element 3. By means of such a drive circuit, the switching element 3 performs switching operation at high speed and at a frequency of 54 KHz, and the rotation of the motor can be controlled by the drive power responsive to the pulse width.

By means of this PWM drive control operation, inductance existing in a coil of an armature of the motor 1 is effectively used. When the source current is not supplied, the stored power is supplied to the motor 1, so that high-speed switching operation is performed. Accordingly, a power loss, which would otherwise arise in an active range of a switching element—which is a drive transistor—another electronic element, is also diminished. Hence, an attempt can be made to achieve power savings.

However, the binocular, the camera, or the like employs a battery cell as the power source of a motor. Hence, PWM control is not enough to achieve sufficient driving efficiency, which raises a problem of the short life of the battery cell.

The function of the vibration-proof mechanism, or the like, of the binocular, the camera, and so on, entails performance of highly-responsive quick operation. Therefore, driving of the motor at a high rotational frequency is desired.

SUMMARY OF THE INVENTION

An object of an illustrative, non-limiting embodiment of the invention is to provide a motor drive circuit, which can diminish power consumed by a motor used in a binocular, a camera, or the like, to thus render the life of the battery cell long; and which can attain a high rotational frequency for the motor.

The above object can be achieved by the following means.

(1) A motor drive circuit comprising:

a power source for driving a motor;

a PWM wave generation circuit that generates a PWM wave having a high frequency and a pulse width modulated in accordance with a rotational frequency control signal sent to a motor;

a semiconductor switching element that performs switching operation upon receipt of an input of the PWM wave output from the PWM wave generation circuit; and a current resonance circuit that induces current resonance in response to source power imparted by switching operation of the semiconductor switching element.

(2) The motor drive circuit according to the above (1), which is applied to a motor in a binocular or a camera, wherein the power source is a battery cell.

(3) The motor drive circuit according to the above (1) or (2), wherein the current resonance circuit induces resonance at a frequency that is 1.1 to 1.7 times a switching frequency of the semiconductor switching element.

According to the above configurations, the current resonance circuit induces current resonance in response to the switching power frequency, whereby the current assumes the shape of a sinusoidal wave. Overlaps between the current and a voltage disappear (i.e., zero switching arises). When compared with a related-art case where only PWM drive control is performed, power consumption is improved by about 30%, and a high rotational frequency can be acquired for a motor. For instance, when the switching frequency is 54 KHz, power consumption can be diminished well, so long as the current resonance frequency is set so as to fall within a range of 60 to 90 KHz.

According to an exemplary embodiment of a motor drive circuit of the present invention, the power consumed by the motor for a vibration-proof mechanism, or the like, can be diminished by about 30%. The life of a battery cell used in a binocular, a camera, or the like, can be made longer. A motor can attain a rotational frequency which is higher than that achieved by the related-art motor. There is yielded an advantage of the ability to quickly perform high-response operation of the vibration-proof mechanism adopted by the binocular, the camera, or the like.

SUMMARY OF THE INVENTION

Figure 1:
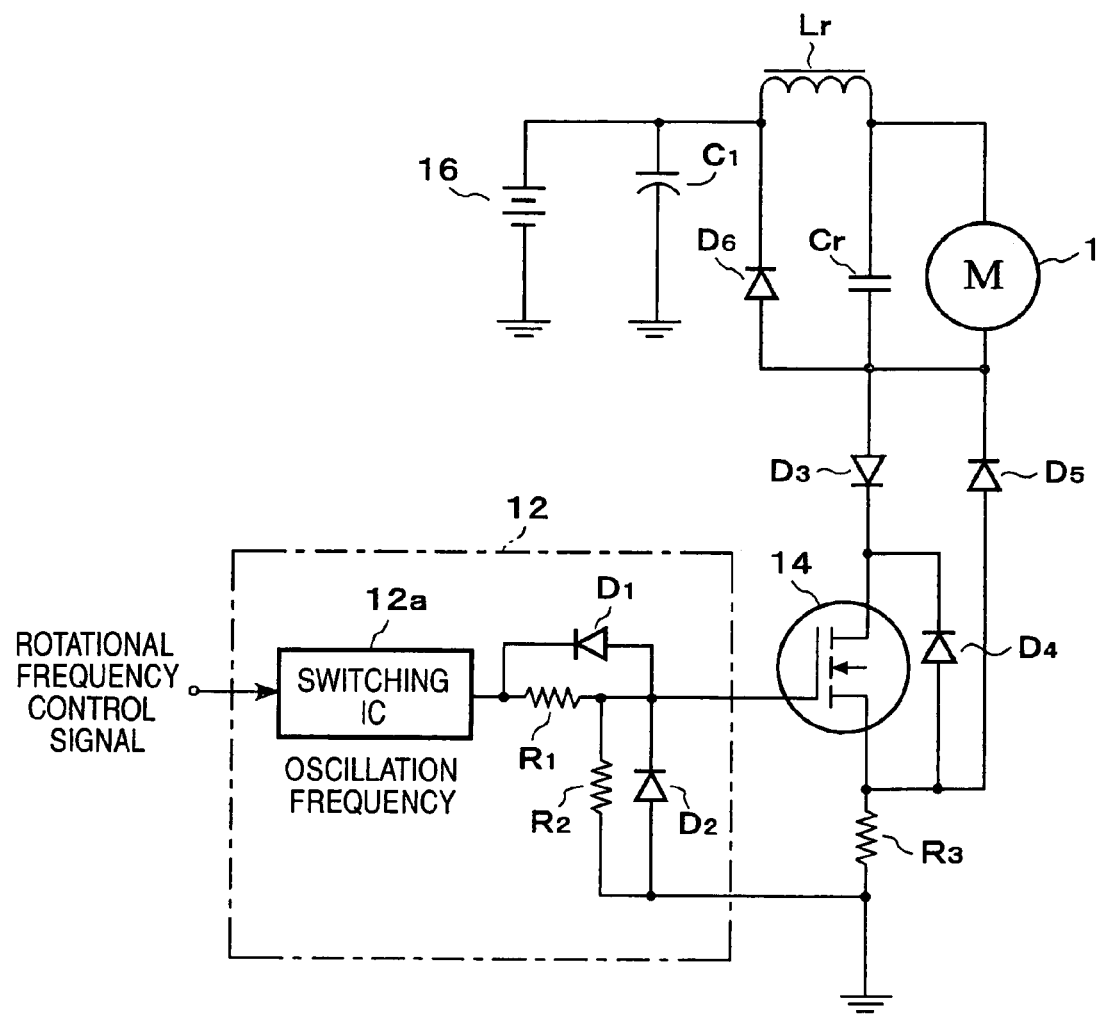
FIG. 1 is a circuit diagram showing the configuration of a motor drive circuit according to an exemplary embodiment of the present invention.

FIG. 1 shows the configuration of a motor drive circuit according to an exemplary embodiment. As shown in FIG. 1, a PWM wave generation circuit 12 has a switching IC circuit 12a which oscillates a 54 KHz frequency signal and outputs a PWM (pulse) wave (controlled signal) whose pulse width has been varied in response to an input rotational frequency control signal; resistors $R_1$, $R_2$; and diodes $D_1$, $D_2$ formed from Schottky barrier diodes, or the like. A switching element 14 formed from an FET (Field-Effect Transistor) is provided such that an output from the PWM wave generation circuit 12 is input to the gate of the switching element 14. The source of the switching element 14 is connected to the ground by way of a resistor $R_3$, and the drain of the switching element 14 is connected to a motor 1 by way of a diode $D_3$. A diode $D_4$ is interposed between the drain and the source of the switching element 14, and a diode $D_5$ is interposed between the source of the switching element 14 and the motor 1 ($D_3$ to $D_5$: Schottky barrier diodes).

A battery cell (power source) 16 of about 3 to 6 volts is provided. A current resonance circuit, which has an inductance (coil) Lr and a capacitor Cr, is provided among the battery cell 16, the switching element 14, and the motor 1, in conjunction with a diode (Schottky barrier diode) $D_6$. A capacitor $C_1$ is connected in parallel to the battery cell 16. The current resonance circuit of the present embodiment is set so as to induce resonance at about 80 KHz, which is about 1.5 times as large as a switching frequency of 54 KHz, under the assumption that the inductance Lr assumes a value of 4.3 µH and the capacitor Cr assumes a value of 1 µF.

According to the motor drive circuit of such a configuration, a PWM wave having a high frequency (e.g., 54 KHz) is output from the PWM wave generation circuit 12 having the switching IC circuit 12*a*. By means of this PWM wave, the switching element 14 performs switching operation, and the power of the battery cell 16 is supplied to the motor 1. At this time, the electric current induces resonance at about 80 KHz by means of the current resonance circuit consisting of the inductance Lr and the capacitor Cr. An electric current having a sinusoidal wave is formed and output.

Figure 3:
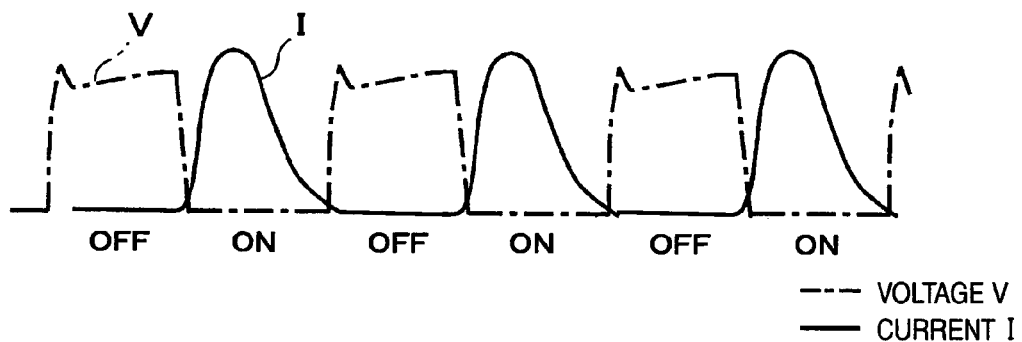
FIG. 3 is a chart showing a waveform of a voltage and a waveform of a current, which are supplied to a motor by means of the motor drive circuit of the embodiment.
Figure 4:
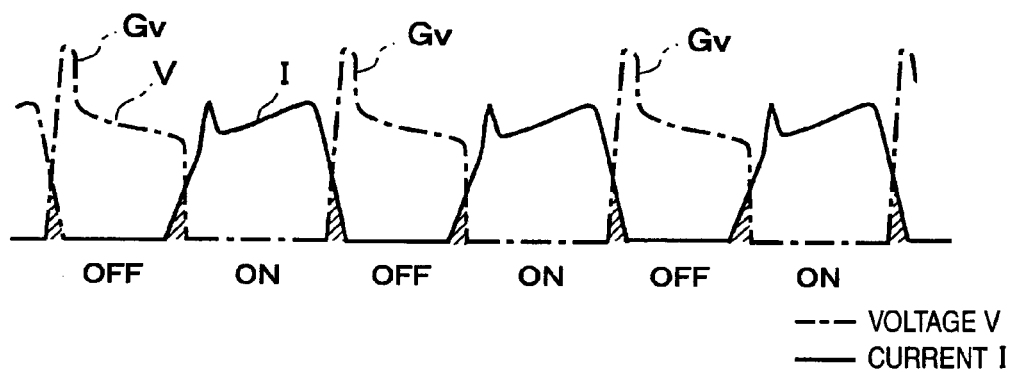
FIG. 4 is a chart showing a waveform of a voltage and a waveform of a current, which are supplied to a motor by means of ordinary (related-art) PWM drive control operation.
Figure 5:
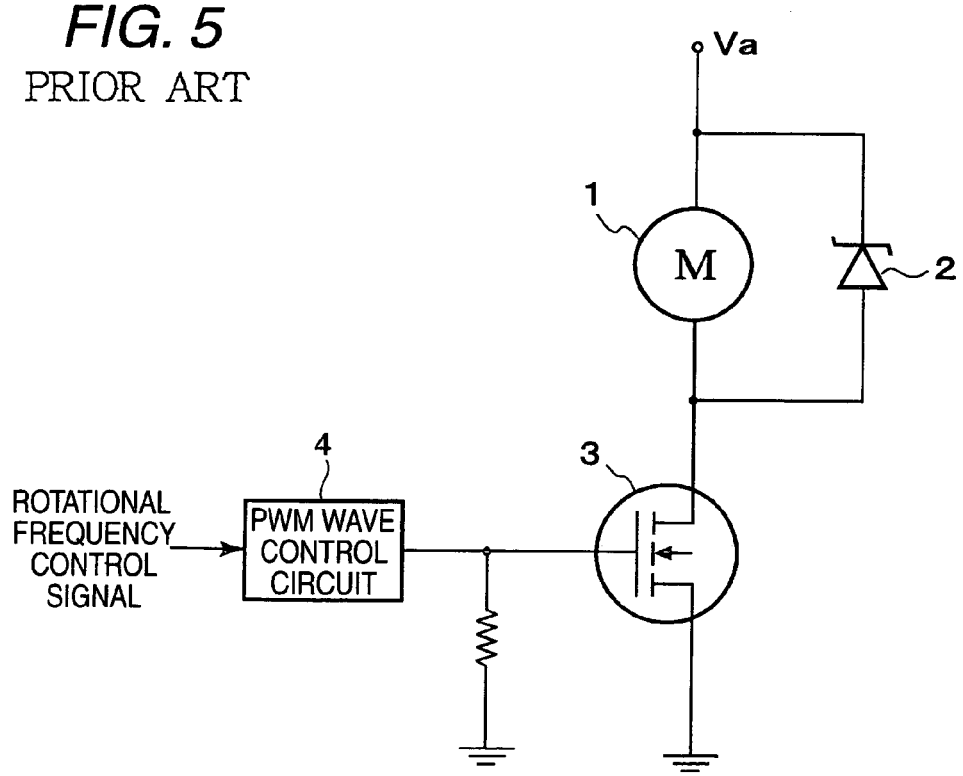
FIG. 5 is a circuit diagram showing the configuration of a related-art motor drive circuit.

FIG. 3 shows a current resonance type PWM drive waveform of the embodiment, and FIG. 4 shows a related-art (ordinary) PWM drive waveform. As seen in the obliquely-shaded sections in FIG. 4, overlaps arise between a voltage V and a current I in the ordinary PWM drive circuit when the switching element 14 is switched between an activated state and a deactivated state, whereby surges indicated by arrow Gv arise. The surges consume the power of the battery cell 16, which in turn induces heat losses. In contrast, in the present embodiment, the current resonance circuit induces current resonance in response to the switching power frequency. As shown in FIG. 3, the electric current I assumes the shape of a sinusoidal wave. As a result, overlaps between the current and the voltage disappear (zero switching arises), which does not induce any surges. Thus, the power of the battery cell 16 consumed by the surges is reduced.

Figure 2:
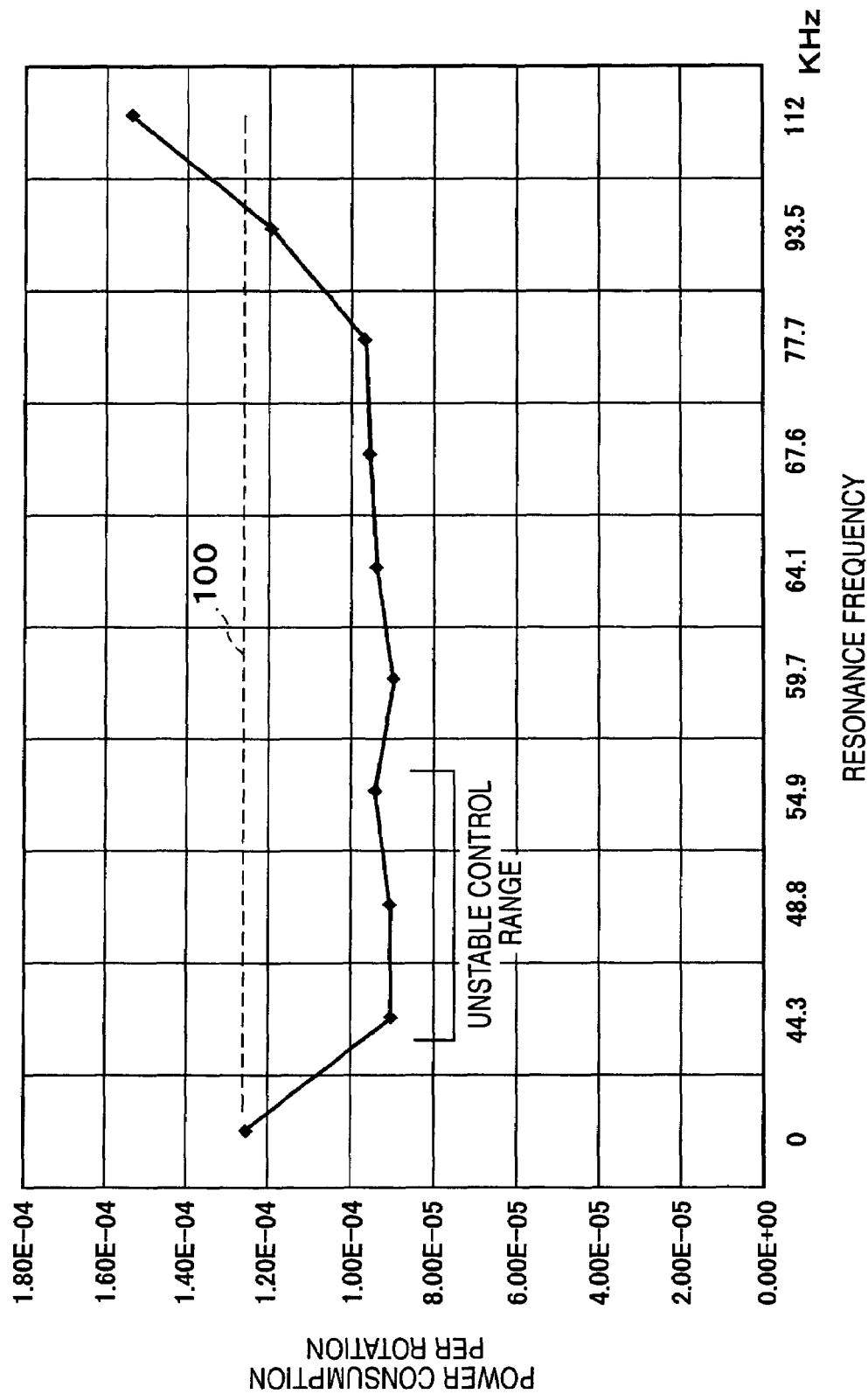
FIG. 2 is a graph showing a relationship between a resonance frequency and power consumption per rotation, which is acquired in the motor drive circuit of the embodiment.

FIG. 2 shows a relationship between the resonance frequency of the current resonance circuit and the power consumed by one rotation of the motor. During ordinary PWM driving which does not induce current resonance, power consumption assumes a value of about 1.25E-04 indicated by a dotted line 100. In contrast, during resonance frequency ranging from 44.3 KHz to 93.5 KHz, power consumption becomes lower than the line 100 for ordinary PWM driving. However, in a test, control became slightly unstable at a resonance frequency of 44.3 KHz, a resonance frequency of 48.8 KHz, and a resonance frequency of 54.9 KHz. Accordingly, a current resonance frequency of about 60 to 90 KHz is preferable. When compared with the case where only PWM control is performed, power consumption is reduced by about 30%.

When the rotational frequency of the motor acquired by the motor drive circuit of the embodiment and the rotational frequency acquired by means of ordinary PWM driving are compared with each other, results shown in Table 1 (the embodiment) and results shown in Table 2 (ordinary PWM driving), which are provided below, are obtained.

TABLE 1

CURRENT RESONANCE PWM DRIVING

| INPUT VOLTAGE | INPUT CURRENT | ROTATIONAL FREQUENCY | POWER CONSUMPTION PER ROTATION |
|---|---|---|---|
| 3.01 V | 102 mA | 4495 rpm | 6.83E-05 |
| 4.02 V | 132 mA | 6292 rpm | 8.42E-05 |
| 5.02 V | 157 mA | 8170 rpm | 9.64E-05 |
| 6.04 V | 183 mA | 10131 rpm | 1.09E-04 |

TABLE 2

ORDINARY PWM DRIVING

| INPUT VOLTAGE | INPUT CURRENT | ROTATIONAL FREQUENCY | POWER CONSUMPTION PER ROTATION |
|---|---|---|---|
| 3.00 V | 82.9 mA | 3379 rpm | 7.36E-05 |
| 4.00 V | 104 mA | 4924 rpm | 8.45E-05 |
| 5.03 V | 124.3 mA | 6535 rpm | 9.54E-05 |
| 6.01 V | 150.4 mA | 7848 rpm | 1.15E-04 |

From a comparison between TABLE 1 and TABLE 2, a rotational frequency of 3379 rpm is achieved at 3V by means of ordinary PWM driving, and a rotational frequency of 7848 rpm is achieved at about 6V by means of ordinary PWM driving. In contrast, a rotational frequency of 4495 rpm is obtained at about 3V by means of current resonance PWM driving of the present embodiment, and a rotational frequency of 10131 rpm is obtained at about 6V by means of current resonance PWM driving of the present embodiment. When compared with the case of related-art PWM driving, higher rotational frequencies are obtained in the embodiment. Consequently, the vibration-proof mechanism, or the like, can perform high-response, quick operation.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application No. JP2005-138038 filed May 11 of 2005, the contents of which is incorporated herein by reference.

What is claimed is:

1. A motor drive circuit comprising:
   a power source for driving a motor;
   a PWM wave generation circuit that generates a PWM wave having a high frequency and a pulse width modulated in accordance with a rotational frequency control signal, the PWM wave being sent to the motor;
   a semiconductor switching element that performs switching operation upon receipt of an input of the PWM wave output from said PWM wave generation circuit; and
   a current resonance circuit that induces current resonance in response to source power imparted by switching operation of said semiconductor switching element.

2. A binocular or a camera including the motor drive circuit according to claim 1, wherein said power source is a battery cell.

3. The motor drive circuit according to claim 1, wherein said current resonance circuit induces resonance at a frequency that is 1.1 to 1.7 times a switching frequency of said semiconductor switching element.

4. The motor drive circuit according to claim 1, wherein overlaps between a current and a voltage in the motor drive circuit, when said semiconductor switching element is switched between an activated state and a deactivated state, are reduced.

5. The motor drive circuit according to claim 1, wherein said PWIVI wave generation circuit includes a switching IC circuit receiving the rotational frequency control signal and oscillating at a frequency.

6. The motor drive circuit according to claim 1, wherein one terminal of said semiconductor switching element is connected to the motor and to an element of said current resonance circuit.

7. The motor drive circuit according to claim 1, wherein said current resonance circuit includes an inductor and a capacitor.

8. A motor system comprising:
a motor;
a power source for driving said motor;
a PWM wave generation circuit that generates a PWM wave having a high frequency and a pulse width modulated in accordance with a rotational frequency control signal, the PWM wave being sent to said motor;
a semiconductor switching element that performs switching operation upon input receipt of the PWM wave output from said PWM wave generation circuit; and
a current resonance circuit that induces current resonance in response to source power imparted by switching operation of said semiconductor switching element.

9. A binocular or a camera including the motor system according to claim 8, wherein said power source is a battery cell.

10. The motor system according to claim 8, wherein said current resonance circuit induces resonance at a frequency that is 1.1 to 1.7 times greater than a switching frequency of said semiconductor switching element.

11. The motor system according to claim 8, wherein overlaps between a current and a voltage in the motor system, when said semiconductor switching element is switched between an activated state and a deactivated state, are reduced.

12. The motor system according to claim 8, wherein said PWM wave generation circuit includes a switching IC circuit receiving the rotational frequency control signal and oscillating at a frequency.

13. The motor system according to claim 8, wherein one terminal of said semiconductor switching element is connected to said motor and to an element of said current resonance circuit.

14. The motor system according to claim 8, wherein said current resonance circuit includes an inductor and a capacitor.

15. A motor drive circuit comprising:
a power source for driving a motor;
a PWM wave generation circuit that generates a PWM wave having a high frequency and a pulse width modulated in accordance with a rotational frequency control signal;
a semiconductor switching element that performs switching operation upon input receipt of the PWM wave output from said PWM wave generation circuit; and
a current resonance circuit that induces current resonance in response to source power imparted by switching operation of said semiconductor switching element,
wherein one terminal of said semiconductor switching element is connected to the motor and to an element of said current resonance circuit.

16. A binocular or a camera including the motor drive circuit according to claim 15, wherein said power source is a battery cell.

17. The motor drive circuit according to claim 15, wherein said current resonance circuit induces resonance at a frequency that is 1.1 to 1.7 times a switching frequency of said semiconductor switching element.

18. The motor drive circuit according to claim 15, wherein overlaps between a current and a voltage in the motor drive circuit, when said semiconductor switching element is switched between an activated state and a deactivated state, are reduced.

19. The motor drive circuit according to claim 15, wherein said PWM wave generation circuit includes a switching IC circuit receiving the rotational frequency control signal and oscillating at a frequency.

20. The motor drive circuit according to claim 15, wherein said current resonance circuit includes an inductor and a capacitor.

* * * * *